United States Patent [19]

Parker et al.

[11] 4,427,571

[45] Jan. 24, 1984

[54] COMPOSITION FOR STRIPPING GOLD OR SILVER FROM PARTICULATE MATERIALS

[75] Inventors: Alan J. Parker, South Perth; David M. Muir, Murdoch, both of Australia

[73] Assignee: Anumin Pty. Ltd., Murdoch, Australia

[21] Appl. No.: 323,558

[22] Filed: Nov. 20, 1981

[30] Foreign Application Priority Data

Nov. 26, 1980 [AU] Australia .............................. PE6633
Jan. 2, 1981 [AU] Australia .............................. PE7115

[51] Int. Cl.$^3$ ............................................... B01F 1/00
[52] U.S. Cl. .................................. 252/364; 204/109; 423/29
[58] Field of Search ................... 252/364, 60; 423/29; 106/1.18, 1.19

[56] References Cited

U.S. PATENT DOCUMENTS

3,787,327  1/1974  Emrick ........................... 252/364 X

FOREIGN PATENT DOCUMENTS

527451   9/1979  Australia .
10367    4/1980  European Pat. Off. .............. 423/29

*Primary Examiner*—Richard D. Lovering
*Attorney, Agent, or Firm*—William R. Hinds

[57] ABSTRACT

The disclosure relates to desorption of gold or silver from particulate materials and in particular to a composition for use in separating gold or silver from particulate material on which it is adsorbed, which comprises a homogeneous phase mixture of aqueous solvent having dissolved therein at least 20% by volume of polar organic solvent or mixture of polar organic solvents selected from ketones containing up to 5 carbon atoms and, preferably, nitriles containing up to 3 carbon atoms, said solvent mixture containing from 0.1% by weight to saturation of a water soluble inorganic cyanide or thio cyanate salt which produces free cyanide or thio cyanate ions in water.

The invention also provides a method of separating gold or silver from particulate materials on which the gold is adsorbed, where the particulate material is eluted with a composition in accordance with the present invention at a temperature in the range from 10° to 50° C., for a period of time sufficient to desorb at least a portion of the adsorbed gold or silver from the particulate material, and then separating the composition containing desorbed gold or silver from the particulate material.

6 Claims, 1 Drawing Figure

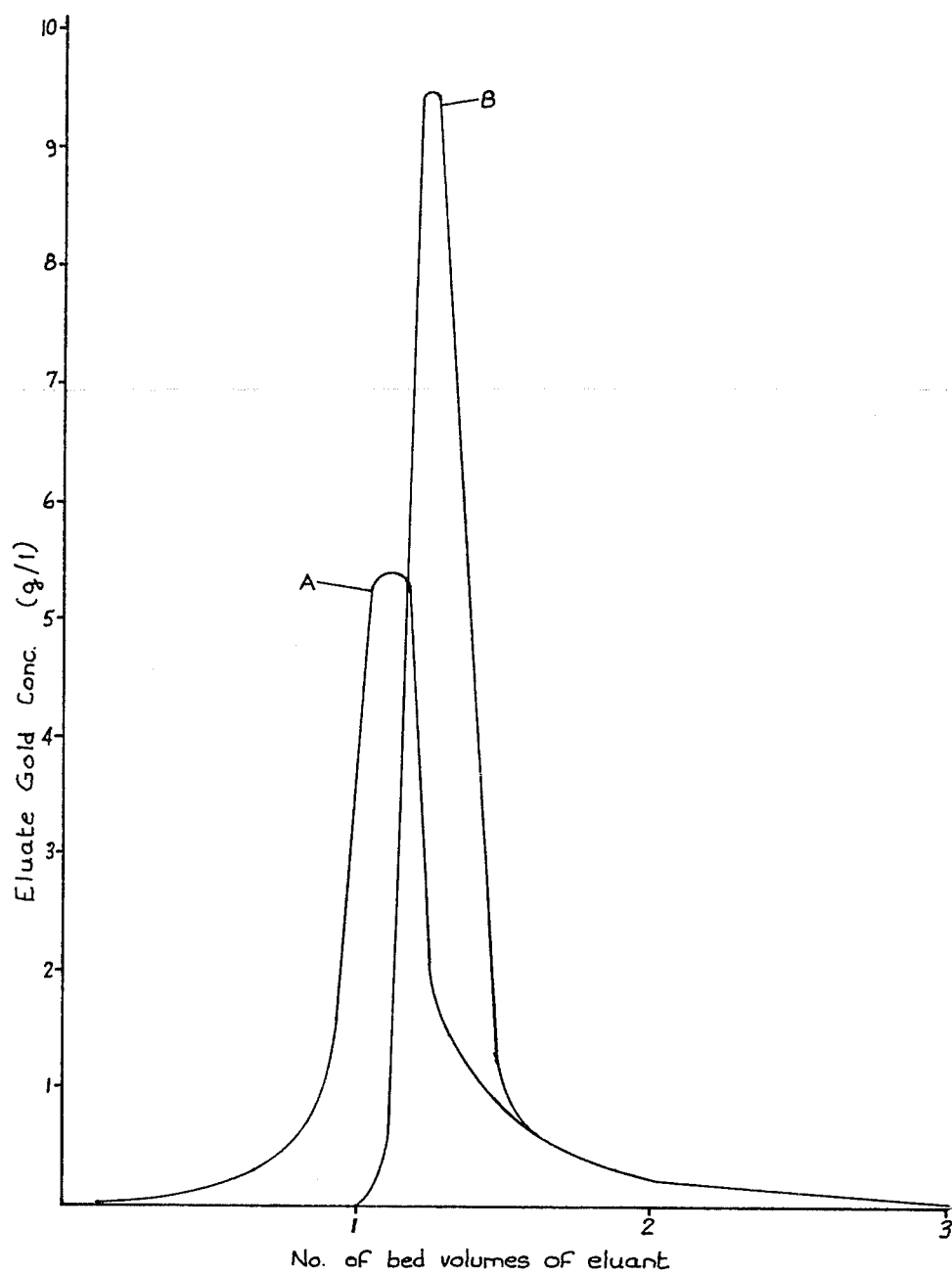

COMPOSITION FOR STRIPPING GOLD OR SILVER FROM PARTICULATE MATERIALS

The present invention relates to gold or silver recovery. Gold and silver in solution, especially as the cyano complex is strongly and preferentially absorbed from dilute solutions onto various particulate materials such as carbonaceous materials, e.g. charcoal, or anion exchange resins. This has lead to carbon in pulp concentration of gold and silver from dilute aqueous solutions, with subsequent elution of the gold or silver from the charcoal, to give a more concentrated solution. The gold or silver can then be electrowon, for example, onto steel wool cathodes or can be cemented with zinc.

The elution of gold or silver from charcoal or carbon has proved to be difficult and highly elevated temperatures have been used together with high concentrations of sodium cyanide and sodium hydroxide and long contact times. In one previously known method charcoal containing gold is contacted for several hours with 5–10% by weight NaCN in 1 M aqueous NaOH at 100°–150° C. in order to solubilize the gold as $Au(CN)_2^-$. A slight improvement in elution has been obtained by adding a little alcohol to the aqueous solution. In view of the high temperatures used, cooling is needed before electrolysis can take place.

In Australian Patent Application No. 51022/79 there is described and claimed a method of recovering metal values selected from gold, silver, copper and nickel from a carbon support having one or more of these values absorbed thereon in the form of an alkaline earth metal ionic complex, the metal value forming part of the anionic portion thereof, including the steps of contacting the support with a pre-treatment reagent, followed by desorbing the metal values from the support with water having a low concentration of metal cations characterised in that the pre-treatment reagent is a mixture of:

(a) an organic solvent, and
(b) a solution selected from the group of an alkali metal cyanide solution, an alkali metal hydroxide solution and a mixture thereof.

In the method of Austrialian Patent Application No. 51022/79, all practical examples of operation of the method the pretreatment reagent contains from 1 to 10 volume percent of organic solvent. Preferably, the organic solvent is an alcohol or ketone.

Further, in the method of Australian Patent Application No. 51022/79, it is essential to use two-steps, i.e. the initial pre-treatment generally for about a half to one bed volume followed by the elution with water which is preferably distilled water. The procedure described in Australian Patent Application No. 51022/79 is only satisfactory at high temperatures such as temperatures of about 70°–80° C. As will be shown hereinafter only small amounts of metal are eluted at low temperatures. Further, the actual description is carried out by water having a low concentration of metal cations such as distilled water.

In the procedure described in Australian Patent Application No. 51022/79 solvent recovery is not economically feasible as the concentration of organic in the eluant is too low to warrant recovery.

Also, at high temperatures acetone is unstable and decomposes to products which de-activate the carbon. We have also found that acetonitrile, which is not mentioned in Australian Patent Application No. 51022/79, is a much more satisfactory solvent than acetone, firstly because of its higher boiling point which reduces fire hazard and secondly because it is much more stable than other organic solvents such as acetone, in the presence of cyanide ions. Thirdly, it has a much smaller deactivation effect on carbon than acetone and alcohol solvents. Desorption at lower temperatures using organic solvents has the advantage of little decomposition of the organic component so that a high percentage thereof can be recovered.

The present invention provides a composition and process for elution of gold or silver at relatively low temperatures. It is found that gold or silver solutions produced by desorption in accordance with the present invention are much more concentrated in gold or silver than solutions obtained from the procedure of Australian Patent Application No. 51022/79. Thus the cost of recovering gold or silver from the eluate such as by electrolysis is reduced.

In accordance with the present invention, there is provided a composition for use in separating gold or silver from particulate material on which it is absorbed, which comprises a homogeneous phase mixture of an aqueous solvent having dissolved therein at least 20% by volume of a polar organic solvent or mixture of polar organic solvents selected from nitriles containing up to 3 carbon atoms, said solvent mixture containing from 0.1% by weight to saturation of a water soluble inorganic cyanide or thiocyanate salt which produces free cyanide or thiocyanate ions in water. The water soluble inorganic cyanide or thiocyanate salt is preferably an alkali metal or alkaline earth metal cyanide or thiocyanate such as sodium cyanide, potassium cyanide or calcium cyanide, sodium thiocyanate, potassium thiocyanate or calcium thiocyanate. Preferably, the water soluble inorganic cyanide or thiocyanate is present in a concentration from 2% by weight up to saturation of the solvent mixture.

The polar organic solvent when an organic nitrile, is preferably acetonitrile but it may also be acrylonitrile, propionitrile.

The polar organic solvent may be used in a concentration of at least 20% by volume of the solvent mixture, preferably at least 25% by volume, with the balance being water. The upper permissible limit of the organic solvent is determined by the need to retain the inorganic salts in solution and is usually about 85% by volume of the solvent mixture. Preferably, the solvent mixture contains from 35 to 55% by volume of the organic solvent with the balance being water. It is envisaged that a mixture of the polar organic solvents recited above can be used. In particular, compounds such as acrylonitrile have a limited solubility in aqueous compositions and therefore to obtain a high concentration of polar organic solvent acrylonitrile is typically used in conjunction with another of the polar organic solvents. The present invention also provides a method of separating gold or silver from particulate materials on which the gold or silver is adsorbed, wherein the particulate material is eluted with a composition in accordance with the present invention for a period of time sufficient to desorb at least a portion of the adsorbed gold or silver from the particulate material, and then separating the composition containing desorbed gold or silver from the particulate material.

The composition containing desorbed gold or silver is usually subsequently subjected to electrolysis so as to deposit the precious metal content onto, for example, steel wool cathodes or titanium cathodes. The gold or silver is usually on carbon in the form of a cyanide complex but the present invention is also satisfactory for use with gold adsorbed on carbon from chloride salts.

The particulate material is eluted with the composition at a temperature in a range from 10° to 50° C., preferably from 20° to 30° C.

Whilst some form of heating can be used if desired, it is preferred to operate the method at ambient temperatures. The method will work at temperatures below 10° C. but the rate of elution is slow. Similarly, the method will work at temperatures above 50° C. but then more energy is required and some decomposition of the solvent is possible. The period of contact varies with the temperatures used, the particular composition used and the desired degree of gold or silver recovery. However, it has been found that times in the range from 2 hours to 24 hours provides satisfactory results. The particulate material is preferably a carbonaceous material such as charcoal but in general any particulate material which will concentrate gold or silver complex ions can be used as a source suitable for stripping by a composition of the present invention.

The polar organic solvents can be somewhat volatile. This applies, for example, to acetonitrile. Therefore, it is preferred to conduct the method of the present invention in closed vessels.

Further, the method can be conducted in a still solution, although reaction proceeds slightly faster with stirring. Also, it has to be borne in mind that the solubility of inorganic cyanide salts tends to be lower in compositions with a large organic component. The preferred method is to desorb the gold or silver by passing the solvent through a column containing carbonaceous material.

The present invention will now be illustrated by the following examples.

EXAMPLE 1

A charcoal from burnt coconuts containing 1400 ppm gold adsorbed from a cyanide solution and some silver was used in all the experiments which are summarised below in Table 1. Two gram samples of the charcoal were immersed in 10 ml of a composition of the present invention in a stoppered vessel in a thermostat. The solutions were not stirred. Samples were taken at intervals and the solution analysed for eluted and desorbed gold by atomic absorption analysis. The results obtained are summarised below in Table 1.

TABLE 1

| Solvent[a] | (NaCN) M | (NaOH) M | Temp °C. | Time hr | % Gold eluted |
|---|---|---|---|---|---|
| Water | 1 | 0.25 | 100 | 4 | >95 |
| Water | 1 | 0.25 | 25 | 22 | 5 |
| 7% Acry-13% An—H$_2$O | 1 | — | 25 | 4 | 50 |
| 40% An—H$_2$O | 1 | — | 25 | 24 | >95[b] |
| 40% An—H$_2$O | 1 | — | 25 | 3 | 70 |
| 40% An—H$_2$O | 1 | — | 25 | 2 | 60 |
| 40% An—H$_2$O | 0.1 | — | 25 | 2 | 18 |
| 40% An—H$_2$O | 0.1 | — | 25 | 6 | 55 |
| 40% An—H$_2$O | 0.1 | — | 25 | 24 | 75 |
| 40% An—H$_2$O | 1 | — | 50 | 22 | >95 |
| 40% An—H$_2$O | 1 | — | 35 | 6 | 90 |
| 20% Ac—H$_2$O | 1 | — | 25 | 6 | 15 |
| 40% Ac—H$_2$O | 1 | — | 25 | 6 | 60 |
| 20% An—H$_2$O | 1 | — | 25 | 6 | 45 |
| 30% An—H$_2$O | 1 (NaSCN) | — | 25 | 6 | 65 |
| Water | 1 | — | 25 | 5 | <2 |
| 40% An—H$_2$O | 1 | — | 25 | 5 | 40 |

[a]An is acetonitrile, Ac is acetone, Acry is acrylonitrile
[b]over 90% of the silver was also eluted.

The elution is preferably conducted until at least 50% of the gold or silver, more preferably at least 75%, has been desorbed. Also, the elution is preferably conducted for at least two bed volumes.

From Table 1 it can be seen that the compositions in accordance with the present invention were much more effective at lower temperatures than is aqueous sodium hydroxide containing sodium cyanide.

It was found that no sodium hydroxide was required in the experiments of Table 1 according to the present invention although a slightly basic solution is desirable to minimise HCN formation.

After elution, in accordance with the present invention, it was found that the charcoal of Example 1 was capable of absorbing gold from dilute (100 ppm Au) aqueous solutions of Au (CN)$_2^-$ in 0.5% NaCN/H$_2$O at room temperature, with a 7% pulp density of charcoal. However, it was first found desirable to remove adsorbed nitrile from the charcoal by washing.

EXAMPLE II

This example was performed in exactly the same way as the experiments summarised in Table 1. The solvent was a 20% solution of methyl ethyl ketone in water. The sodium cyanide concentration was 1 M, the temperature was 25° C. and the elution time was 6 hours. The percentage of gold eluted was 90%.

EXAMPLE III

Coconut carbon loaded with gold was obtained from a gold cyanide circuit containing 5500 grams of gold as Ca (AuCN$_2$)$_2$. per tonne.

The coconut carbon was eluted with a solution containing 40% volume/volume acetonitrile/water having dissolved therein 50 grams per liter of sodium cyanide.

The elution rate used was 0.5 bed volumes per hour at 25° C. 88% of the gold on the carbon was desorbed after four hours in two bed volumes of eluant. 98.5% of the gold was recovered in 3.2 bed volumes of eluant after 6.5 hours. The maximum concentrate of gold in the eluant was 5200 grams/tonne of solution. The elution curve obtained is shown as a curve A in FIG. 1.

EXAMPLE IV

Example II was repeated except that the elution rate was decreased to 0.25 bed volume per hour. Gold recovery was 86.8% after eight hours in 2 bed volumes of eluate and 98% after ten hours in 2.5 bed volumes of eluate.

The maximum concentration of desorbed gold in the eluate was 9400 grams per tonne of solution. The elution curve obtained is shown as curve B in FIG. 1.

EXAMPLE V

Carbon loaded with gold from gold chloride solution contained 13400 grams/tonne of gold. On elution of 2 grams of carbon with 100 ml of solution containing 40% V/V acetonitrile/water and 40 grams/liter NaCN for 15 minutes 92% of the gold on the carbon was desorbed. After 60 minutes 98% of the gold was desorbed. Elution was carried out at 25° C.

COMPARATIVE EXAMPLE

Coconut carbon loaded from a cyanide circuit with gold in the form of $Ca(AuCN_2)_2$ containing 6800 grams of gold per tonne was pretreated by soaking with 1 bed volume of a solution containing 20% by volume of acetone and 1% by weight sodium cyanide and 1% sodium hydroxide for 1 hour at 50° C. followed by desorption with water at 25° C. Only 19% of the gold contained in the carbon was recovered in 10 bed volumes of eluant. Thus, the two stage treatment of Australian Patent Application No. 51022/79 when desorption with water is carried out at ambient temperatures is very inefficient. As an extension of the method of the present invention, eluted carbonaceous material can also be used to remove zinc salts from solution, the zinc salts having resulted from cementation of gold cyanide solution with zinc. The material can then be cleaned of zinc and other adsorbed material with acid and recycled to adsorb more gold from dilute aqueous solutions. In this connection, the gold containing eluate can be treated with zinc to precipitate metallic gold and then the barren solution containing zinc salts contacted with the stripped carbonaceous material to partly remove the zinc.

The recovered gold may be electrowon from a solution of its gold (I) cyano complex containing at least 1000 ppm gold in the composition of the present invention, preferably using a steel wool or carbon or titanium cathode and an inert anode such as carbon or stainless steel. The electrolyzed composition can then be used again for elution. If necessary, the composition can be made up with inorganic cyanide salt or polar organic solvent as required. Modifications and variations such as would be apparent to a skilled addressee are deemed within the scope of the present invention.

We claim:

1. A composition for use in separating gold or silver from particulate material on which it is adsorbed, which comprises a homogeneous phase mixture of aqueous solvent having dissolved therein at least 20% by volume of a polar organic solvent or a mixture of polar organic solvents selected from the group consisting of organic nitriles containing up to 3 carbon atoms, said solvent mixture containing from 0.1% by weight to saturation of a water soluble inorganic cyanide or thiocyanate salt which produces free cyanide or thiocyanate ions in water.

2. A composition according to claim 1, wherein the polar organic solvent is acetonitrile.

3. A composition according to claim 1, wherein the water soluble salt is an alkali metal or alkaline earth metal cyanide or thio cyanate.

4. A composition according to claim 1, in which the water soluble salt is present in a concentration from 2% by weight up to saturation of the solvent mixture.

5. A composition according to claim 1, in which the polar organic solvent or the mixture of polar organic solvents is used in a concentration of at least 25% by volume of the solvent mixture.

6. A composition according to claim 5, in which the polar organic solvent or the mixture of polar organic solvents is used in a concentration of from 35 to 55% by volume of the solvent mixture.

* * * * *